United States Patent
Zhang (10) Patent No.: US 10,791,299 B2
(45) Date of Patent: Sep. 29, 2020

(54) TELEVISION TERMINAL, METHOD FOR CONVERTING HDR IMAGE INTO SDR IMAGE, AND COMPUTER READABLE STORAGE MEDIUM

(71) Applicant: SHENZHEN TCL NEW TECHNOLOGY CO., LTD., Shenzhen (CN)

(72) Inventor: Xiaodong Zhang, Shenzhen (CN)

(73) Assignee: SHENZHEN TCL NEW TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/672,750

(22) Filed: Nov. 4, 2019

(65) Prior Publication Data

US 2020/0068161 A1    Feb. 27, 2020

Related U.S. Application Data

(63) Continuation of application No. PCT/CN2017/111363, filed on Nov. 16, 2017.

(30) Foreign Application Priority Data

Jun. 9, 2017    (CN) .......................... 2017 1 0435930

(51) Int. Cl.
     *H04N 7/01*      (2006.01)
     *H04N 5/46*      (2006.01)

(52) U.S. Cl.
     CPC .................. *H04N 5/46* (2013.01); *H04N 7/01* (2013.01)

(58) Field of Classification Search
     CPC .......... H04N 5/46; H04N 7/01; H04N 7/0117; H04N 7/0125; H04N 7/0127; H04N 7/015; G06T 2207/20208

(Continued)

(56) References Cited

U.S. PATENT DOCUMENTS

| | | | |
|---|---|---|---|
| 2017/0085879 A1 | 3/2017 | Minoo et al. | |
| 2018/0336669 A1* | 11/2018 | Mertens | ................. G09G 5/026 |
| 2019/0045137 A1* | 2/2019 | Kamiya | ............... H04N 5/2351 |

FOREIGN PATENT DOCUMENTS

| | | |
|---|---|---|
| CN | 101099174 A | 1/2008 |
| CN | 104813666 A | 7/2015 |

(Continued)

OTHER PUBLICATIONS

International Search Report, dated Feb. 24, 2018, for Shenzhen TCL New Technology Co., Ltd, International Application No. PCT/CN2017/111363, Filed Nov. 16, 2017.

(Continued)

*Primary Examiner* — Sherrie Hsia
(74) *Attorney, Agent, or Firm* — Law Offices of Albert Wai-Kit Chan, PLLC (57) ABSTRACT

Disclosed is a method for converting an HDR image into an SDR image. The method includes the following operations: acquiring, by a television terminal, input HDR image data, and processing, by the television terminal, the acquired HDR image data through a first normalization; linearizing, by the television terminal, the HDR image data processed through the first normalization; processing, by the television terminal, the linearized HDR image data through a second normalization; and converting, by the television terminal, the HDR image data processed through the second normalization into SDR image data with a supported format. The present disclosure further provides a television terminal and a computer readable storage medium. The present disclosure effectively avoids the technical problem of a poor image display effect caused by that the non-HDR receivers cannot show the HDR effect. The present disclosure enables non-HDR receivers to show the HDR effect and improves the image display effect.

17 Claims, 5 Drawing Sheets

(58) Field of Classification Search
USPC .......................................... 348/441, 458, 459
See application file for complete search history.

(56) References Cited

FOREIGN PATENT DOCUMENTS

| | | | |
|---|---|---|---|
| CN | 105393525 | A | 3/2016 |
| CN | 105794216 | A | 7/2016 |
| CN | 105917646 | A | 8/2016 |
| CN | 105979192 | A | 9/2016 |
| CN | 106097948 | A | 11/2016 |
| CN | 106105177 | A | 11/2016 |
| CN | 106210735 | A | 12/2016 |
| CN | 106464892 | A | 2/2017 |
| CN | 106464923 | A | 2/2017 |
| CN | 106603941 | A | 4/2017 |
| CN | 107277399 | A | 10/2017 |
| EP | 3054418 | A1 | 8/2016 |

OTHER PUBLICATIONS

Written Opinion, dated Feb. 24, 2018, for Shenzhen TCL New Technology Co., Ltd, International Application No. PCT/CN2017/111363, Filed Nov. 16, 2017.
CNIPA Office Action, dated Oct. 11, 2019, for Shenzhen TCL New Technology Co., Ltd, Application No. 201710435930.3, filed Jun. 9, 2017.

* cited by examiner

TELEVISION TERMINAL, METHOD FOR CONVERTING HDR IMAGE INTO SDR IMAGE, AND COMPUTER READABLE STORAGE MEDIUM

TECHNICAL FIELD

The present disclosure relates to the technical field of electronic devices, and in particular, to a television terminal, a method for converting an HDR image into an SDR image and a computer readable storage medium.

BACKGROUND

High-Dynamic Range (HDR) TV technology, such as HDR10, Dolby Vison, HLG, etc., refers to a complete set of processing technologies including filming, editing, and post-processing, transmitting, receiving, and displaying.

The aforementioned HDR technologies all adopt BT2020 color space, for significantly expanding the color gamut range. HDR10 uses Perceptual Quantizer (PQ) with a bit depth of 10-bits developed by the SMPTE ST 2084, and SMTPE ST2086 static metadata. Dolby Vision uses PQ with a bit depth of 12-bits developed by the SMPTE ST 2084. HLG uses Hybrid Log-Gamma (HLG) with a bit depth of 10 bits.

Standard-Dynamic Range (SDR) technology or Low-Dynamic Range (LDR) technology which is widely used in television broadcasting systems, is corresponding with HDR technology. SDR adopts BT709 (High Definition) or BT601 (Standard Definition) color space, and uses 8-bit BT1886 (Gamma). The dynamic range of color or luminance of SDR is much smaller than that of HDR.

Nowadays, none of the above HDR technologies are compatible with SDR contents. The TV broadcast receiver which cannot receive HDR contents is not be able to reproduce the HDR effect and the SDR effect. That is, the HDR contents displayed on non-HDR TVs present a pale effect and lose the contrast. Only the content made on the basis of HDR can be displayed on the TV designed on the basis of HDR with the high dynamic feature of HDR. Therefore, the current non-HDR receiver cannot show the HDR effect, resulting in a poor image display effect.

The above contents are only used to assist in understanding the technical solutions of the present disclosure, and do not constitute the prior arts.

SUMMARY

The main objective of the present disclosure is to provide a television terminal, a method for converting an HDR image into an SDR image and a computer readable storage medium, aiming at solving the problem of a poor image display effect which is caused by that non-HDR receiver cannot show the HDR effect.

In order to achieve the above objective, the present disclosure provides a method for converting an HDR image into an SDR image, the method includes the following operations:

acquiring, by a television terminal, input HDR image data, and processing, by the television terminal, the acquired HDR image data through a first normalization;

linearizing, by the television terminal, the HDR image data processed through the first normalization;

processing, by the television terminal, the linearized HDR image data through a second normalization; and converting, by the television terminal, the HDR image data processed through the second normalization into SDR image data with a supported format.

Preferably, the operation of "processing, by the television terminal, the acquired HDR image data through a first normalization" includes:

determining, by the television terminal, a maximum coded value in the acquired HDR image data; and processing, by the television terminal, all coded values in the acquired HDR image data through the first normalization and the maximum coded value, a value of the HDR image data processed through the first normalization has a range of [0, 1], an equation for the first normalization is:

$N = S_{HDR}/(2^n-1)$, N is the value of the HDR image data processed through the first normalization, n is a bit depth of an image data signal, and $S_{HDR}$ is an input HDR signal quantization coded by PQ.

Preferably, the operation of "linearizing, by the television terminal, the HDR image data processed through the first normalization" includes restoring, by the television terminal, the HDR image data processed through the first normalization to linear data before being coded, an equation for the restoring operation is:

$L = (\max[(N^{1/m2})-c1, 0]/(c2-c3N^{1/m2}))^{1/m1}$, c1, c2, c3, m1 and m2 are constants.

Preferably, the operation of "converting, by the television terminal, the HDR image data processed through the second normalization into SDR image data with a supported format" includes:

acquiring, by the television terminal, a peak luminance value of a display; and converting, by the television terminal, the HDR image data processed through the second normalization into the SDR image data with a format supported by the display based on the peak luminance value of the display, an equation for the second normalization is:

$L_N = L/c_m$, $c_m$ is a coded value of maximum luminance of the signal, and L is the linear data before being coded.

Preferably, the second normalization is configured to normalize the coded value of maximum luminance of the signal, for normalizing the obtained value in a range of 0 to 1, and a minimum value is 0 and a maximum value is 1.

Preferably, the method further includes:

converting linear data in an HDR format into linear data in an SDR format based on a maximum peak luminance value of the display, and outputting SDR signal data, an equation for the converting operation is:

$S_{SDR} = (2^m-1)*M*L^{\gamma/2}$, $\gamma = 1 + a\log 10(Y_p/1000)$, $Y_p$ is the peak luminance value of the display (cd/m$^2$), a is a constant, m is a bit depth of an SDR signal, usually the SDR signal is 8 bits, i.e., m=8, and M has a range of 0 to 1 which is presented as an adjusting curve.

Preferably, after the operation of "converting, by the television terminal, the HDR image data processed through the second normalization into SDR image data with a supported format", the method further includes:

outputting, by the television terminal, the converted SDR image data based on the format supported by the display.

In addition, in order to achieve the above objective, the present disclosure further provides a television terminal, the television terminal includes a memory, a processor, a program for converting an HDR image into an SDR image stored on the memory and executable on the processor, the program, when executed by the processor, implements the following operations:

acquiring input HDR image data, and processing the acquired HDR image data through a first normalization;

linearizing the HDR image data processed through the first normalization;

processing the linearized HDR image data through a second normalization; and converting the HDR image data processed through the second normalization into SDR image data with a supported format.

Preferably, the program, when executed by the processor, implements the following operations:

determining a maximum coded value in the acquired HDR image data; and processing all coded values in the acquired HDR image data through the first normalization and the maximum coded value, a value of the HDR image data processed through the first normalization has a range of [0, 1], an equation for the first normalization is:

$N=S_{HDR}/(2^n-1)$, N is the value of the HDR image data processed through the first normalization, n is a bit depth of an image data signal, and $S_{HDR}$ is an input HDR signal quantization coded by PQ.

Preferably, the program, when executed by the processor, implements the following operations:

restoring the HDR image data processed through the first normalization to linear data before being coded, an equation for the restoring operation is:

$L=(\max[(N^{1}/m2)-c1, 0]/(c2-c3N^{1}/m2))^{1/m1}$, c1, c2, c3, m1 and m2 are constants.

Preferably, the program, when executed by the processor, implements the following operations:

acquiring a peak luminance value of a display; and converting the HDR image data processed through the second normalization into the SDR image data with a format supported by the display based on the peak luminance value of the display, an equation for the second normalization is:

$L_N=L/c_m$, $c_m$ is a coded value of maximum luminance of the signal, and L is the linear data before being coded.

Preferably, the second normalization is configured to normalize the coded value of maximum luminance of the signal, for normalizing the obtained value in a range of 0 to 1, and a minimum value is 0 and a maximum value is 1.

Preferably, the program, when executed by the processor, implements the following operations:

converting linear data in an HDR format into linear data in an SDR format based on a maximum peak luminance value of the display, and outputting SDR signal data, an equation for the converting operation is:

$S_{SDR}=(2^m-1)*M*L^{\gamma}/2$, $\gamma=1+a\mathrm{Log}10(Y_p/1000)$, $Y_p$ is the peak luminance value of the display (cd/m$^2$), a is a constant, m is a bit depth of an SDR signal, usually the SDR signal is 8 bits, i.e., m=8, and M has a range of 0 to 1 which is presented as an adjusting curve.

Preferably, the program, when executed by the processor, implements the following operations:

outputting the converted SDR image data based on the format supported by the display.

Besides, in order to achieve the above objective, the present disclosure further provides a computer readable storage medium, the computer readable storage medium stores a program for converting an HDR image into an SDR image, the program, when executed by a processor, implements operations of a method for converting the HDR image into the SDR image.

In the solution of the present disclosure, the HDR input signal is converted into the SDR signal by normalizing, linearizing, normalizing, and converting the input HDR image data, such that the HDR image data can be displayed on the non-HDR television terminal, such as an SDR television terminal, with a better display effect. The technical problem of a poor image display effect which is caused by that non-HDR receiver cannot show the HDR effect is solved. The non-HDR receiver of the present disclosure can show the HDR effect and improve the image display effect.

The realization of the objective, functional characteristics, advantages of the present disclosure are further described with reference to the accompanying drawings.

DETAILED DESCRIPTION OF THE EMBODIMENTS

It should be understood that the specific embodiments described herein are merely illustrative of the disclosure and are not intended to limit the disclosure.

The main solution of the embodiment of the present disclosure includes: acquiring, by a television terminal, input HDR image data, and processing, by the television terminal, the acquired HDR image data through a first normalization; linearizing, by the television terminal, the HDR image data processed through the first normalization; processing, by the television terminal, the linearized HDR image data through a second normalization; and converting, by the television terminal, the HDR image data processed through the second normalization into SDR image data with a supported format.

As to the technical problem of a poor image display effect which is caused by that non-HDR receiver cannot show the HDR effect, in the solution of the present disclosure, the HDR input signal is converted into the SDR signal by normalizing, linearizing, normalizing, and converting the input HDR image data, so that the HDR image data can be displayed on the non-HDR television terminal, such as an SDR television terminal, with a better display effect. The technical problem of a poor image display effect which is caused by that non-HDR receiver cannot show the HDR effect is solved. The non-HDR receiver of the present disclosure can show the HDR effect and improve the image display effect.

Figure 1:
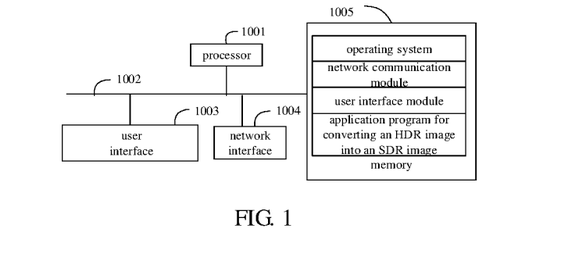
FIG. 1 is a schematic structural diagram of a terminal/device in a hardware operating environment according to an embodiment of the present disclosure.

As shown in FIG. 1, FIG. 1 is a schematic structural diagram of a terminal in a hardware operating environment according to an embodiment of the present disclosure.

In embodiments of the present disclosure, the television terminal is configured to convert the HDR image data into the SDR image data, and implement compatible playback, such that other signal source image data can be displayed on each of the terminals with the best display effect.

As shown in FIG. 1, the television terminal may include a processor 1001, such as a CPU, a network interface 1004, a user interface 1003, a memory 1005, and a communication bus 1002. The communication bus 1002 is configured to implement the connection communication between these components. The user interface 1003 may include a display, an input unit such as a keyboard, optionally, the user interface 1003 may also include a standard wired interface, a wireless interface (such as a WI-FI interface). Optionally, the network interface 1004 may include a standard wired interface, a wireless interface (such as a WI-FI interface). The memory 1005 may be a high speed RAM memory or a non-volatile memory such as a disk memory. Optionally, the memory 1005 may also be a storage device independent of the foregoing processor 1001.

Optionally, the terminal may further include a camera, a Radio Frequency (RF) circuitry, a sensor, an audio circuitry, a WiFi module, etc. The sensor may include a light sensor, a motion sensor, and the like. Specifically, the light sensor may include an ambient light sensor and a proximity sensor. The ambient light sensor may adjust the brightness of the display screen according to the brightness of ambient light, and the proximity sensor may turn off the display screen and/or backlight when the mobile terminal moves to the ear. The gravity acceleration sensor, which is regarded as a kind of motion sensor, can detect the magnitudes of accelerations in all directions (generally including X axis, Y axis, and Z axis). The gravity acceleration sensor can also detect the magnitude and direction of gravity when the terminal is still. As such the gravity acceleration sensor can be applied to application for identifying attitude of mobile terminal (such as an application for switching the screen between horizontal orientation and vertical orientation, an application related to game, an application for calibrating attitude of magnetometer), can also be applied to application for identifying vibration (such as pedometer, tapping), etc. Of course, the mobile terminal can also be equipped with a gyroscope, a barometer, a hygrometer, a thermometer, an infrared sensor, and the like, which is not described repeatedly herein.

Those skilled in the art can understand that the structure as shown in FIG. 1 does not constitute a limitation on the terminal, and the terminal may include more or fewer components than shown, or a combination of some components, or different components.

As shown in FIG. 1, the memory 1005 as a computer storage medium may include an operating system, a network communication module, a user interface module, and an application program for converting an HDR image into an SDR image.

In the terminal shown in FIG. 1, the network interface 1004 is mainly configured to connect with the background server and perform data communication with the background server; the user interface 1003 is mainly configured to connect with a client (user end) and perform data communication with the client; the processor 1001 may call the application program for converting the HDR image into the SDR image stored on the memory 1005, and perform the following operations:

acquiring input HDR image data, and processing the acquired HDR image data through a first normalization;

linearizing the HDR image data processed through the first normalization;

processing the linearized HDR image data through a second normalization; and converting the HDR image data processed through the second normalization into SDR image data with a supported format.

Further, the processor 1001 may call the application program for converting the HDR image into the SDR image stored on the memory 1005, and perform the following operations:

determining a maximum coded value in the acquired HDR image data; and processing all coded values in the acquired HDR image data through the first normalization and the maximum coded value, a value of the HDR image data processed through the first normalization has a range of [0, 1], an equation for the first normalization is:

$N = S_{HDR}/(2^n - 1)$, N is the value of the HDR image data processed through the first normalization, n is a bit depth of an image data signal, and $S_{HDR}$ is an input HDR signal quantization coded by PQ.

Further, the processor 1001 may call the application program for converting the HDR image into the SDR image stored on the memory 1005, and perform the following operations:

restoring the HDR image data processed through the first normalization to linear data before being coded, an equation for the restoring operation is:

$L = (\max[(N^{1/m2} - c1, 0]/(c2 - c3 N^{1/m2}))^{1/m1}$, c1, c2, c3, m1 and m2 are constants.

Further, the processor 1001 may call the application program for converting the HDR image into the SDR image stored on the memory 1005, and perform the following operations:

acquiring a peak luminance value of a display; and converting the HDR image data processed through the second normalization into the SDR image data with a format supported by the display based on the peak luminance value of the display, an equation for the second normalization is:

$L_N = L/c_m$, $c_m$ is a coded value of maximum luminance of the signal, and L is the linear data before being coded.

Further, the processor 1001 may call the application program for converting the HDR image into the SDR image stored on the memory 1005, and perform the following operations:

outputting the converted SDR image data based on the format supported by the display.

Figure 2:
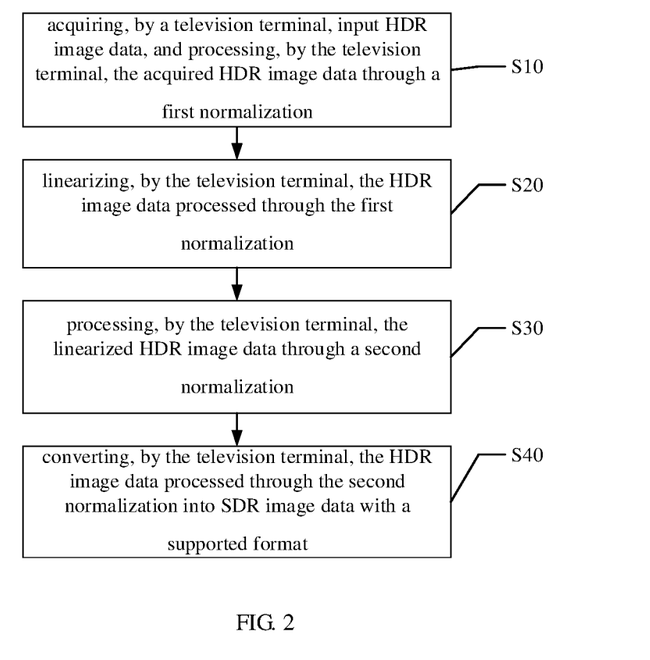
FIG. 2 is a schematic flowchart of a method for converting an HDR image into an SDR image according to an embodiment of the present disclosure.

Referring to FIG. 2, a first embodiment of the present disclosure provides a method for converting an HDR image into an SDR image, which includes the following operations:

Step S10, acquiring, by a television terminal, input HDR image data, and processing, by the television terminal, the acquired HDR image data through a first normalization;

In an embodiment of the present disclosure, the television terminal is a non-HDR television, for example, an SDR television, which cannot directly play image data in an HDR format. The television terminal receives the input image data signal which is an HDR signal. A value of the HDR image input data which is quantization coded by PQ has a range of 0 to $(2^n - 1)$. The acquired HDR image data is processed through a first normalization, i.e., the quantization coded HDR image input data is processed through the first normalization.

Figure 3:
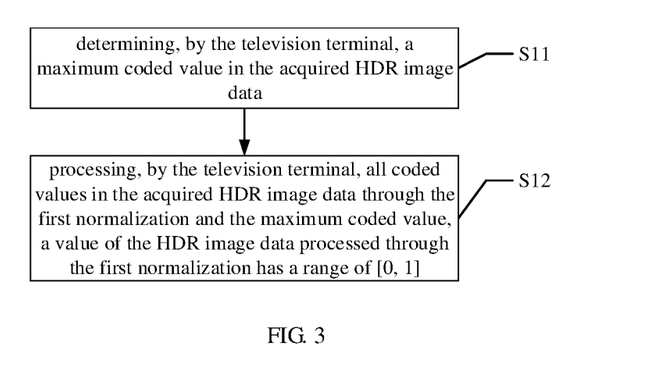
FIG. 3 is a schematic flowchart of processing, by the television terminal, the acquired HDR image data through a first normalization according to an embodiment of the present disclosure.

Specifically, referring to FIG. 3, the operation of "processing, by the television terminal, the acquired HDR image data through a first normalization" includes the following operations:

Step S11, determining, by the television terminal, a maximum coded value in the acquired HDR image data; step S12, processing, by the television terminal, all coded values in the acquired HDR image data through the first normalization and the maximum coded value, a value of the HDR image data processed through the first normalization has a range of [0, 1]. After normalizing the maximum coded value ($2^n-1$), the HDR image data N processed through the first normalization is obtained. An equation for the first normalization is: $N=S_{HDR}/(2^n-1)$, n is a bit depth of the HDR image data signal, usually the HDR signal is 10 bits or 12 bits, i.e., n=10 or 12, and $S_{HDR}$ is an input HDR signal quantization coded by PQ. The raw HDR data has a range of 0 to 1023 (n=10) which can be normalized to 0 to 1.

Step S20, linearizing, by the television terminal, the HDR image data processed through the first normalization;

After normalizing the acquired HDR image data, the television terminal linearizes the HDR image data processed through the first normalization. The linearization process is to restore linear data of the HDR signal before being coded by PQ, and the television terminal restores the HDR image data processed through the first normalization to the linear data before being coded. An equation for the restoring operation through SMTPE ST2084 is: $L=(max[(N^{1/m2})-c1, 0]/(c2-c3N^{1/m2}))^{1/m1}$, c1, c2, c3, m1 and m2 are constants.

Step S30, processing, by the television terminal, the linearized HDR image data through a second normalization;

After linearizing the HDR image data, the television terminal processes the linearized HDR image data through the second normalization, the second normalization is to further normalize a coded value of maximum luminance of the signal, for ensuring the obtained value in a range of 0 to 1, and a minimum value is 0 and a maximum value is 1. An equation for the second normalization is: $L_N=L/c_m$, $c_m$ is the coded value of maximum luminance of the signal, the information of the coded value is derived from the metadata of the HDR signal.

Step S40, converting, by the television terminal, the HDR image data processed through the second normalization into SDR image data with a supported format.

Figure 4:
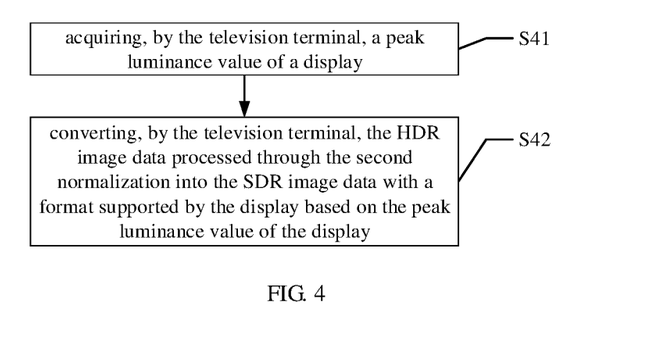
FIG. 4 is a schematic flowchart of converting, by the television terminal, the HDR image data processed through the second normalization into SDR image data with a supported format according to an embodiment of the present disclosure.

The supported format is a non-HDR format such as an SDR format. The television terminal can play an image data having a signal source of HDR by converting the HDR format into the SDR format. Specifically, referring to FIG. 4, the operation of "converting, by the television terminal, the HDR image data processed through the second normalization into SDR image data with a supported format" includes the following operations:

Step S41, acquiring, by the television terminal, a peak luminance value of a display;

Step S42, converting, by the television terminal, the HDR image data processed through the second normalization into the SDR image data with a format supported by the display based on the peak luminance value of the display.

Format conversion is to convert linear data in an HDR format into linear data in an SDR format based on the display capability (maximum peak luminance) of the display, and SDR signal data (which has a range of 0 to 255 when the bit depth is 8 bits) is output. An equation for the converting operation is:

$S_{SDR}=(2^m-1)*M*L^{\gamma/2}$, $\gamma=1+aLog10(Y_p/1000)$, $Y_p$ is the peak luminance value of the display (cd/m²), a is a constant, m is a bit depth of SDR signal, usually SDR signal is 8 bits, i.e., m=8, and M has a range of 0 to 1 which is presented as an adjusting curve, the curve is a readjustment of linear signal, and is also a customized adjustment of SDR signal. This process is to re-MAPPING the raw linear data. It can be seen that, different displays have different display capabilities and different maximum peak luminance values. After the HDR signal is processed through the above process, the data $S_{SDR}$ obtained from different display screens is not the same, such that the different display screens can all show the best SDR display effect.

In the television terminal of the present embodiment, the HDR input signal is converted into the SDR signal by normalizing, linearizing, normalizing, and converting the input HDR image data, such that the HDR image data can be displayed on the non-HDR television terminal, such as an SDR television terminal, with a better display effect. The technical problem of a poor image display effect which is caused by that non-HDR receiver cannot show the HDR effect is solved. The non-HDR receiver of the present disclosure can show the HDR effect and improve the image display effect.

Figure 5:
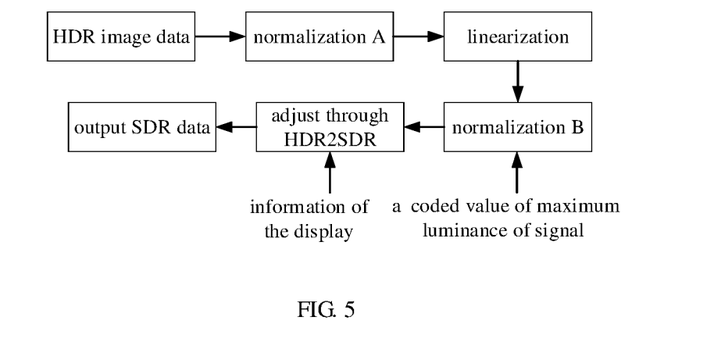
FIG. 5 is a schematic frame diagram of converting the HDR image data into the SDR image data according to an embodiment of the present disclosure.
Figure 6:
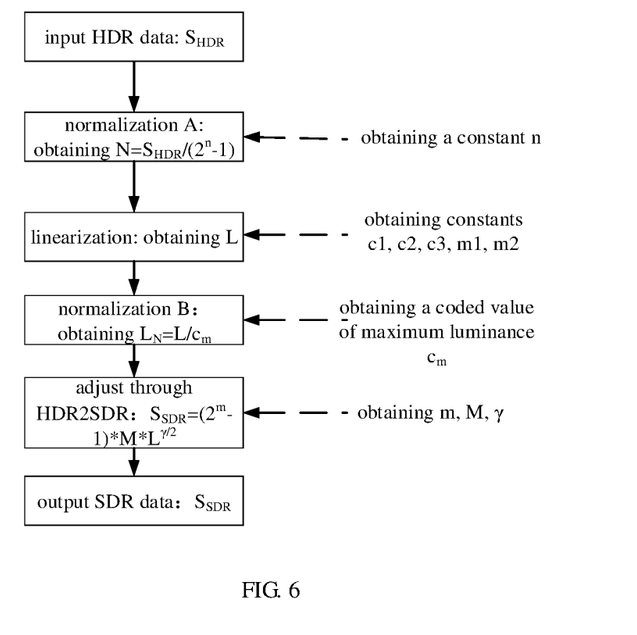
FIG. 6 is a schematic flowchart of converting the HDR image data into the SDR image data according to an embodiment of the present disclosure.

Further, for a better description of the embodiments of the present disclosure, referring to FIG. 5 and FIG. 6, the method for converting the HDR image into the SDR image of the present embodiment includes the following operations, for ensuring that the non-HDR receiver can display the HDR signal: processing normalization A on input HDR data $S_{HDR}$ to obtain the normalized data N; processing linearization on N to obtain the linearized data L; processing normalization B on the linearized data L and a maximum coded value of signal to obtain data $L_N$; and adjusting $L_N$ through HDR2SDR and outputting $S_{SDR}$ signal.

In an embodiment, the present disclosure further provides a television terminal, the television terminal includes a memory, a processor, a program for converting an HDR image into an SDR image stored on the memory and executable on the processor, the program, when executed by the processor, implements the following operations:

acquiring input HDR image data, and processing the acquired HDR image data through a first normalization;

In an embodiment of the present disclosure, the television terminal is a non-HDR television, for example, an SDR television, which cannot directly play image data in an HDR format. The television terminal receives the input image data signal which is an HDR signal. A value of the HDR image input data which is quantization coded by PQ has a range of 0 to ($2^n-1$). The acquired HDR image data is processed through a first normalization, i.e., the quantization coded HDR image input data is processed through the first normalization.

Specifically, the operation of "processing the acquired HDR image data through a first normalization" includes the following operations:

determining a maximum coded value in the acquired HDR image data; processing, by the television terminal, all coded values in the acquired HDR image data through the first normalization and the maximum coded value, a value of the HDR image data processed through the first normalization has a range of [0, 1]. After normalizing the maximum coded value ($2^n-1$), the HDR image data N processed through the first normalization is obtained. An equation for the first normalization is: $N=S_{HDR}/(2^n-1)$, n is a bit depth of the HDR image data signal, usually the HDR signal is 10 bits or 12 bits, i.e., n=10 or 12, and $S_{HDR}$ is an input HDR signal quantization coded by PQ. The raw HDR data has a range of 0 to 1023 (n=10) which can be normalized to 0 to 1.

linearizing the HDR image data processed through the first normalization;

After normalizing the acquired HDR image data, the television terminal linearizes the HDR image data processed through the first normalization. The linearization process is to restore linear data of the HDR signal before being coded by PQ, and the television terminal restores the HDR image data processed through the first normalization to the linear data before being coded. An equation for the restoring operation through SMTPE ST2084 is: $L=(\max[(N^{1/m2})-c_1, 0]/(c_2-c_3 N^{1/m2}))^{1/m1}$, c1, c2, c3, m1 and m2 are constants.

processing the linearized HDR image data through a second normalization;

After linearizing the HDR image data, the television terminal processes the linearized HDR image data through a second normalization, the second normalization is to further normalize a coded value of maximum luminance of the signal, for ensuring the obtained value in a range of 0 to 1, and a minimum value is 0 and a maximum value is 1. An equation for the second normalization is: $L_N = L/c_m$, $c_m$ is the coded value of maximum luminance of the signal, the information of the coded value is derived from the metadata of the HDR signal.

converting, by the television terminal, the HDR image data processed through the second normalization into SDR image data with a supported format.

The supported format is a non-HDR format such as an SDR format. The television terminal can play an image data having a signal source of HDR by converting the HDR format into the SDR format.

Specifically, the operation of "converting the HDR image data processed through the second normalization into SDR image data with a supported format" includes the following operations:

acquiring a peak luminance value of a display;

converting the HDR image data processed through the second normalization into the SDR image data with a format supported by the display based on the peak luminance value of the display.

Format conversion is to convert linear data in an HDR format into linear data in an SDR format based on the display capability (maximum peak luminance) of the display, and SDR signal data (which has a range of 0 to 255 when the bit depth is 8 bits) is output. An equation for the converting operation is:

$S_{SDR}=(2^m-1)*M*L^{\gamma/2}$, $\gamma=1+a\mathrm{Log}10(Y_p/1000)$, $Y_p$ is the peak luminance value of the display (cd/m$^2$), a is a constant, m is a bit depth of an SDR signal, usually the SDR signal is 8 bits, i.e., m=8, and M has a range of 0 to 1 which is presented as an adjusting curve, the curve is a readjustment of linear signal, and is also a customized adjustment of SDR signal. This process is to re-MAPPING the raw linear data. It can be seen that, different displays have different display capabilities and different maximum peak luminance values. After the HDR signal is processed through the above process, the data $S_{SDR}$ obtained from different display screens is not the same, such that the different display screens can all show the best SDR display effect.

In the present embodiment, the HDR input signal is converted into the SDR signal by normalizing, linearizing, normalizing, and converting the input HDR image data, such that the HDR image data can be displayed on the non-HDR television terminal, such as an SDR television terminal, with a better display effect. The technical problem of a poor image display effect which is caused by that non-HDR receiver cannot show the HDR effect is solved. The non-HDR receiver of the present disclosure can show the HDR effect and improve the image display effect.

Besides, the present disclosure further provides a computer readable storage medium, the computer readable storage medium stores a program for converting an HDR image into an SDR image, the program, when executed by a processor, implements the following operations:

acquiring input HDR image data, and processing the acquired HDR image data through a first normalization;

linearizing the HDR image data processed through the first normalization;

processing the linearized HDR image data through a second normalization; and converting the HDR image data processed through the second normalization into SDR image data with a supported format.

Further, the program, when executed by the processor, implements the following operations:

determining a maximum coded value in the acquired HDR image data; and processing all coded values in the acquired HDR image data through the first normalization and the maximum coded value, a value of the HDR image data processed through the first normalization has a range of [0, 1], an equation for the first normalization is:

$N=S_{HDR}/(2^n-1)$, N is the value of the HDR image data processed through the first normalization, n is a bit depth of image data signal, and $S_{HDR}$ is an input HDR signal quantization coded by PQ.

Further, the program, when executed by the processor, implements the following operations:

restoring the HDR image data processed through the first normalization to linear data before being coded, an equation for the restoring operation is:

$L=(\max[(N^{1/m2})-c_1, 0]/(c_2-c_3 N^{1/m2}))^{1/m1}$, c1, c2, c3, m1 and m2 are constants.

Further, the program, when executed by the processor, implements the following operations:

acquiring a peak luminance value of a display; and converting the HDR image data processed through the second normalization into the SDR image data with a format supported by the display based on the peak luminance value of the display, an equation for the second normalization is:

$L_N=L/c_m$, $c_m$ is a coded value of maximum luminance of the signal, and L is the linear data before being coded.

Further, the program, when executed by the processor, implements the following operations:

outputting the converted SDR image data based on the format supported by the display.

It should be noted that in this document, the terms "including", "comprising", or any other variant thereof are intended to cover a non-exclusive inclusion, thus, a process, method, article, or system that comprises a plurality of elements includes not only those elements but also other elements not specifically listed, or elements that are inherent to such a process, method, article, or system. An element defined by the phrase "comprising a . . . " does not exclude the presence of additional equivalent elements in a process, method, article, or system that includes the element, without further limitation.

The serial numbers of the embodiments of the present disclosure are merely for the description, and do not represent the advantages and disadvantages of the embodiments.

Through the description of the above embodiments, it can be clearly understood by those skilled in the art that the method of the above embodiments can be implemented by means of software plus a necessary general hardware platform, and can also be implemented by hardware, but in many cases, the former is a better implementation. Based on such understanding, the technical solution of the present disclosure, which is essential or contributes to the prior art, can be embodied in the form of a software product. The computer software product is stored on a storage medium (e.g., ROM/RAM, disk, optical disk) as described above, and includes instructions for causing a terminal device (e.g., a cell phone, computer, server, TV, or network device, etc.) to perform the methods described in various embodiments of the present disclosure.

The above are only preferred embodiments of the present disclosure, and thus do not limit the scope of the present disclosure. The equivalent structure or equivalent process transformations made by the present specification and the drawings are directly or indirectly applied to other related technical fields, and are included in the scope of the present disclosure.

What is claimed is:

1. A method for converting an HDR image into an SDR image, wherein the method comprises the following operations:
    acquiring, by a television terminal, input HDR image data, and processing, by the television terminal, the acquired HDR image data through a first normalization;
    linearizing, by the television terminal, the HDR image data processed through the first normalization;
    processing, by the television terminal, the linearized HDR image data through a second normalization; and
    converting, by the television terminal, the HDR image data processed through the second normalization into SDR image data with a supported format;
    wherein the operation of "processing, by the television terminal, the acquired HDR image data through a first normalization" comprises:
    determining, by the television terminal, a maximum coded value in the acquired HDR image data; and
    processing, by the television terminal, all coded values in the acquired HDR image data through the first normalization and the maximum coded value, a value of the HDR image data processed through the first normalization has a range of [0, 1], wherein an equation for the first normalization is:
    $N=S_{HDR}/(2^n-1)$, N is the value of the HDR image data processed through the first normalization, n is a bit depth of an image data signal, and $S_{HDR}$ is an input HDR signal quantization coded by Perceptual Quantizer.

2. The method of claim 1, wherein the operation of "linearizing, by the television terminal, the HDR image data processed through the first normalization" comprises:
    restoring, by the television terminal, the HDR image data processed through the first normalization to linear data before being coded, an equation for the restoring operation is:
    $L=(\max[(N^1/m2)-c1, 0]/(c2-c3N^1/m2))^{1/m1}$, wherein c1, c2, c3, m1 and m2 are constants.

3. The method of claim 2, wherein the operation of "converting, by the television terminal, the HDR image data processed through the second normalization into SDR image data with a supported format" comprises:
    acquiring, by the television terminal, a peak luminance value of a display; and
    converting, by the television terminal, the HDR image data processed through the second normalization into the SDR image data with a format supported by the display based on the peak luminance value of the display, wherein an equation for the second normalization is:
    $L_N=L/c_m$, wherein $c_m$ is a coded value of maximum luminance of the signal, and L is the linear data before being coded.

4. The method of claim 3, wherein the second normalization is configured to normalize the coded value of maximum luminance of the signal, for normalizing the obtained value in a range of 0 to 1, and a minimum value is 0 and a maximum value is 1.

5. The method of claim 3, wherein the method further comprises:
    converting linear data in an HDR format into linear data in an SDR format based on a maximum peak luminance value of the display, and outputting SDR signal data, an equation for the converting operation is:
    $S_{SDR}=(2^m-1)*M*L^{\gamma}/2$, wherein $\gamma=1+a\mathrm{Log}10(Y_p/1000)$, $Y_p$ is the peak luminance value of the display (cd/m$^2$), a is a constant, m is a bit depth of an SDR signal, usually the SDR signal is 8 bits, i.e., m=8, and M has a range of 0 to 1 which is presented as an adjusting curve.

6. The method of claim 1, wherein after the operation of "converting, by the television terminal, the HDR image data processed through the second normalization into SDR image data with a supported format", the method further comprises:
    outputting, by the television terminal, the converted SDR image data based on the format supported by the display.

7. The method of claim 1, wherein after the operation of "converting, by the television terminal, the HDR image data processed through the second normalization into SDR image data with a supported format", the method further comprises:
    outputting, by the television terminal, the converted SDR image data based on the format supported by the display.

8. A television terminal, wherein the television terminal comprises a memory, a processor, and a program for converting an HDR image into an SDR image stored on the memory and executable on the processor, the program, when executed by the processor, implements the following operations:
    acquiring input HDR image data, and processing the acquired HDR image data through a first normalization;
    linearizing the HDR image data processed through the first normalization;
    processing the linearized HDR image data through a second normalization; and
    converting the HDR image data processed through the second normalization into SDR image data with a supported format;
    wherein the operation of "processing the acquired HDR image data through a first normalization" comprises:
    determining a maximum coded value in the acquired HDR image data; and
    processing all coded values in the acquired HDR image data through the first normalization and the maximum coded value, a value of the HDR image data processed through the first normalization has a range of [0, 1], wherein an equation for the first normalization is:
    $N=S_{HDR}/(2^n-1)$, N is the value of the HDR image data processed through the first normalization, n is a bit depth of an image data signal, and $S_{HDR}$ is an input HDR signal quantization coded by Perceptual Quantizer.

9. The television terminal of claim 8, wherein the program, when executed by the processor, implements the following operations:
restoring the HDR image data processed through the first normalization to linear data before being coded, an equation for the restoring operation is:
$L=(\max[(N^{1/m2})-c1, 0]/(c2-c3N^{1/m2}))^{1/m1}$, wherein c1, c2, c3, m1 and m2 are constants.

10. The television terminal of claim 8, wherein the program, when executed by the processor, implements the following operations:
acquiring a peak luminance value of a display; and
converting the HDR image data processed through the second normalization into the SDR image data with a format supported by the display based on the peak luminance value of the display, wherein an equation for the second normalization is:
$L_N=L/c_m$, wherein $c_m$ is a coded value of maximum luminance of the signal, and L is the linear data before being coded.

11. The television terminal of claim 10, wherein the second normalization is configured to normalize the coded value of maximum luminance of the signal, for normalizing the obtained value in a range of 0 to 1, and a minimum value is 0 and a maximum value is 1.

12. The television terminal of claim 10, wherein the program, when executed by the processor, implements the following operations:
converting linear data in an HDR format into linear data in an SDR format based on a maximum peak luminance value of the display, and outputting SDR signal data, an equation for the converting operation is:
$S_{SDR}=(2m-1)*M*L^{\gamma/2}$, wherein $\gamma=1+a\text{Log}10(Y_p/1000)$, $Y_p$ is the peak luminance value of the display (cd/m$^2$), a is a constant, m is a bit depth of an SDR signal, usually the SDR signal is 8 bits, i.e., m=8, and M has a range of 0 to 1 which is presented as an adjusting curve.

13. The television terminal of claim 8, wherein the program, when executed by the processor, implements the following operations:
outputting the converted SDR image data based on the format supported by the display.

14. The television terminal of claim 8, wherein the program, when executed by the processor, implements the following operations:
outputting the converted SDR image data based on the format supported by the display.

15. A non-transitory computer readable storage medium, wherein the non-transitory computer readable storage medium stores a program for converting an HDR image into an SDR image, the program, when executed by a processor, implements operations of the method for converting the HDR image into the SDR image, wherein the method comprises the following operations:
acquiring, by a television terminal, input HDR image data, and processing, by the television terminal, the acquired HDR image data through a first normalization;
linearizing, by the television terminal, the HDR image data processed through the first normalization;
processing, by the television terminal, the linearized HDR image data through a second normalization; and
converting, by the television terminal, the HDR image data processed through the second normalization into SDR image data with a supported format;
wherein the operation of "processing, by the television terminal, the acquired HDR image data through a first normalization" comprises:
determining, by the television terminal, a maximum coded value in the acquired HDR image data; and
processing, by the television terminal, all coded values in the acquired HDR image data through the first normalization and the maximum coded value, a value of the HDR image data processed through the first normalization has a range of [0, 1], wherein an equation for the first normalization is:
$N=S_{HDR}/(2^n-1)$, N is the value of the HDR image data processed through the first normalization, n is a bit depth of an image data signal, and $S_{HDR}$ is an input HDR signal quantization coded by Perceptual Quantizer.

16. The non-transitory computer readable storage medium of claim 15, wherein the operation of "linearizing, by the television terminal, the HDR image data processed through the first normalization" comprises:
restoring, by the television terminal, the HDR image data processed through the first normalization to linear data before being coded, an equation for the restoring operation is:
$L=(\max[(N^{1/m2})-c1, 0]/(c2-c3N^{1/m2}))^{1/m1}$, wherein c1, c2, c3, m1 and m2 are constants.

17. The non-transitory computer readable storage medium of claim 15, wherein after the operation of "converting, by the television terminal, the HDR image data processed through the second normalization into SDR image data with a supported format", the method further comprises:
outputting, by the television terminal, the converted SDR image data based on the format supported by the display.

* * * * *